(12) United States Patent
Pan et al.

(10) Patent No.: US 9,955,464 B2
(45) Date of Patent: Apr. 24, 2018

(54) METHOD AND DEVICE FOR R-PDCCH TRANSMISSION IN SCENARIO OF CARRIER AGGREGATION

(75) Inventors: Xueming Pan, Beijing (CN); Zukang Shen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 412 days.

(21) Appl. No.: 13/994,477

(22) PCT Filed: Dec. 15, 2011

(86) PCT No.: PCT/CN2011/084076
§ 371 (c)(1),
(2), (4) Date: Jun. 17, 2013

(87) PCT Pub. No.: WO2012/079528
PCT Pub. Date: Jun. 21, 2012

(65) Prior Publication Data
US 2013/0279400 A1    Oct. 24, 2013

(30) Foreign Application Priority Data

Dec. 15, 2010   (CN) .......................... 2010 1 0606125

(51) Int. Cl.
*H04W 72/04* (2009.01)
*H04L 5/00* (2006.01)
(Continued)

(52) U.S. Cl.
CPC .......... *H04W 72/042* (2013.01); *H04L 5/001* (2013.01); *H04L 5/0032* (2013.01);
(Continued)

(58) Field of Classification Search
CPC . H04W 72/00; H04W 72/12; H04W 72/1289; H04W 72/1273; H04W 24/00;
(Continued)

(56) References Cited

U.S. PATENT DOCUMENTS 8,848,520 B2 * 9/2014 Chen et al. .................... 370/229
2006/0274712 A1* 12/2006 Malladi .............. H04B 1/70735
370/345

(Continued)

*Primary Examiner* — Jeffrey M Rutkowski
*Assistant Examiner* — Jonathan B Wood
(74) *Attorney, Agent, or Firm* — Oliff PLC (57) ABSTRACT

Disclosed are a method and device for R-PDCCH transmission in the scenario of carrier aggregation. By way of applying the technical solution of the embodiments of the present invention, multi-carrier aggregation transmission is supported between the relay node and the base station. The base station sends a component carrier carrying the R-PDCCH to the relay node and schedules the resources in each component carrier by way of the R-PDCCH carried in the component carrier. Thus what is achieved is that the base station communicates with the relay node by way of a plurality of aggregated component carriers, enabling the link transmission resources between the base station and the relay node to support multi-carrier PDCCH scheduling, improving the transmitting capacity of the link between the base station and the relay node, and improving the system performance.

13 Claims, 7 Drawing Sheets

(51) Int. Cl.
*H04W 72/12* (2009.01)
*H04W 84/04* (2009.01)

(52) U.S. Cl.
CPC .......... *H04L 5/0053* (2013.01); *H04L 5/0064* (2013.01); *H04L 5/0091* (2013.01); *H04W 72/0453* (2013.01); *H04W 72/12* (2013.01); *H04W 84/047* (2013.01)

(58) Field of Classification Search
CPC ..... H04W 24/10; H04W 48/12; H04W 48/16; H04W 84/047; H04W 88/04; H04W 88/08
See application file for complete search history.

(56) References Cited

U.S. PATENT DOCUMENTS

| | | | |
|---|---|---|---|
| 2008/0232341 A1* | 9/2008 | Andrews | H04W 72/1252 370/345 |
| 2010/0215011 A1* | 8/2010 | Pan | H04L 5/0064 370/329 |
| 2011/0274031 A1* | 11/2011 | Gaal et al. | 370/315 |
| 2012/0078933 A1* | 3/2012 | Kim | H04L 5/0007 707/758 |
| 2012/0093063 A1* | 4/2012 | Yuan et al. | 370/315 |
| 2012/0093082 A1* | 4/2012 | Kim et al. | 370/328 |
| 2012/0113945 A1* | 5/2012 | Moon | H04L 1/1861 370/329 |
| 2012/0114021 A1* | 5/2012 | Chung et al. | 375/211 |
| 2012/0120868 A1* | 5/2012 | Park et al. | 370/315 |
| 2012/0147794 A1* | 6/2012 | Chung et al. | 370/280 |
| 2012/0207079 A1* | 8/2012 | Wang et al. | 370/315 |
| 2012/0320782 A1* | 12/2012 | Seo et al. | 370/252 |
| 2012/0320840 A1* | 12/2012 | Kim et al. | 370/329 |
| 2013/0010684 A1* | 1/2013 | Park et al. | 370/315 |
| 2013/0083719 A1* | 4/2013 | Seo et al. | 370/312 |
| 2013/0155868 A1* | 6/2013 | Seo et al. | 370/241 |
| 2013/0201964 A1* | 8/2013 | Kim et al. | 370/335 |
| 2013/0315109 A1* | 11/2013 | Raaf et al. | 370/277 |

* cited by examiner

METHOD AND DEVICE FOR R-PDCCH TRANSMISSION IN SCENARIO OF CARRIER AGGREGATION

CROSS REFERENCE TO RELATED APPLICATIONS

This application is the National Stage of PCT/CN2011/084076 filed on Dec. 15, 2011, which claims priority under 35 U.S.C. § 119 of Chinese Application No. 201010606125.0 filed on Dec. 15, 2010, the disclosures of which are incorporated by reference. The international application under PCT article 21(2) was not published in English.

FIELD OF THE PRESENT INVENTION

The present invention relates to the field of communication technology, in particular to the method and device for R-PDCCH transmission in the scenario of carrier aggregation.

BACKGROUND OF THE PRESENT INVENTION

RN (Relay Node) technology is introduced into LTE (Long Term Evolution) Rel-10 system, with the main purpose of extending the coverage area of eNB (evolved Node B, i.e., base station) cell, wherein the Relay node represents an eNB to the UE (User Equipment) communicated therewith.

Figure 1:
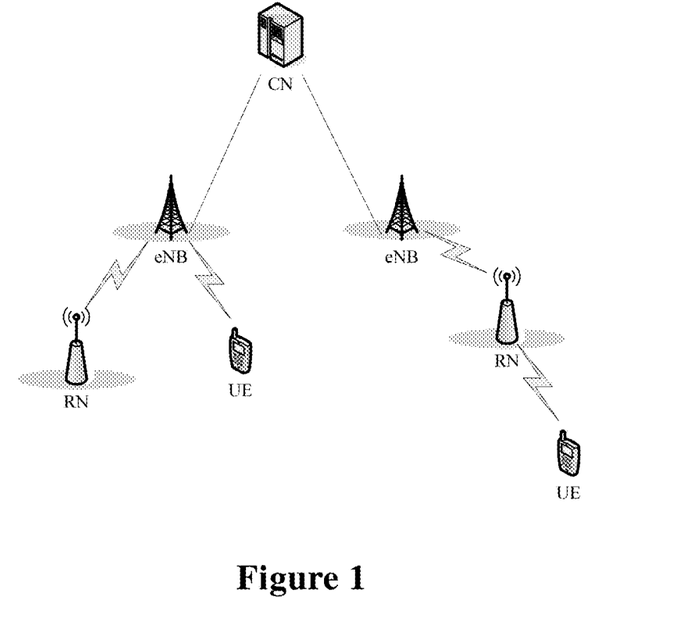
FIG. 1 is the network architecture diagram of Rel-10 after Relay node is introduced into prior art.

In prior art, network architecture diagram of Rel-10 is shown in FIG. 1 after Relay node is introduced.

Introduction of relay node enables three wireless links of Relay-based mobile communication system exist:

Direct link between eNB and macro UE (UE directly served by eNB);

Backhaul link (or named Un link) between eNB and RN;

Access link (or named Uu link) between RN and relay UE (UE served by relay node).

Therefore, such three links shall use orthogonal radio resources in consideration of the signal interference limit of wireless communication.

Figure 2:
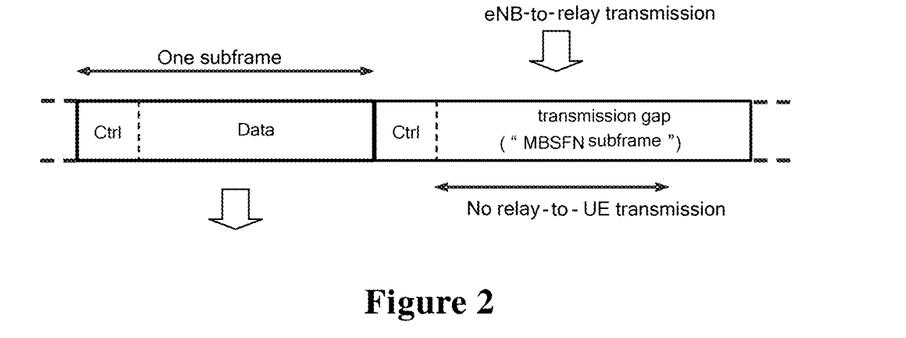
FIG. 2 is the schematic diagram for scenario of receiving the relay downlink transmission in prior art by using MBSFN subframe.

On the same frequency band, relay node shall not send and receive data simultaneously to avoid self-interference. In LTE Rel-10, relay node may receive downlink backhaul data from donor eNB through the method of MBSFN (Multicast Broadcast Single Frequency Network) subframe, with the receiving scenario diagram shown in FIG. 2.

In an MBSFN subframe, relay node sends PDCCH (Physical Downlink Control Channel) to the served user terminal (R-UE) on one or two OFDM (Orthogonal Frequency Division Multiplexing) symbols. On subsequent OFDM symbols of the MBSFN subframe, the relay node receives the control (named R-PDCCH (Relay-Physical Downlink Control Channel)) and data (named R-PDSCH) from donor eNB.

Figure 3:
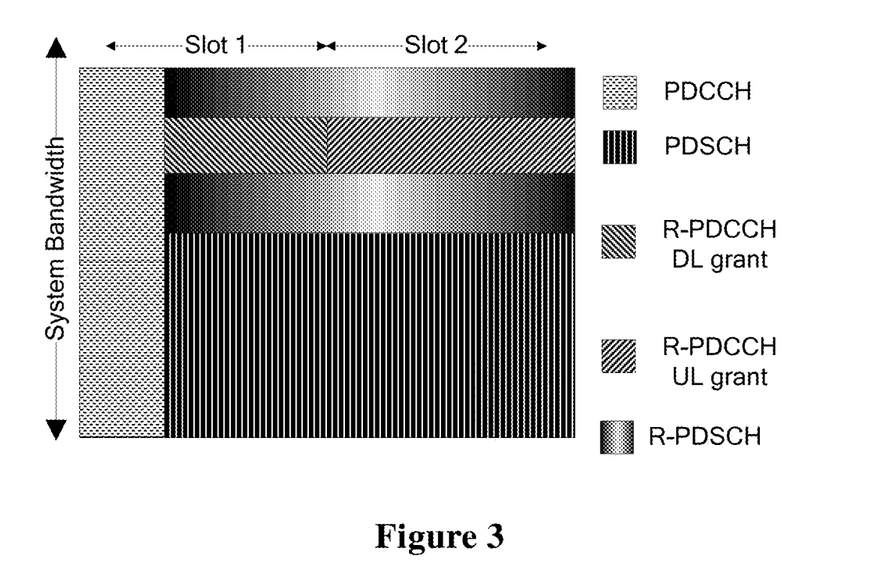
FIG. 3 is the schematic diagram for channel multiplexing in relay link in prior art.

In the MBSFN subframe configured as downlink backhaul, RN receives R-PDCCH and R-PDSCH (Physical Downlink Shared Channel) sent by donor eNB, eNB starts sending R-PDCCH from the fourth symbol, wherein the DL grant (downlink grant) is sent at the first timeslot and the UL grant (Uplink grant) is sent at the second timeslot. PDSCH (R-PDSCH) of RN can be sent in non-control region of MBSFN by occupying both the first and second slots; or the second slot after DL grant. Multiplex modes of R-PDSCH, R-PDCCH, PDSCH and PDCCH are shown in FIG. 3.

Figure 4:
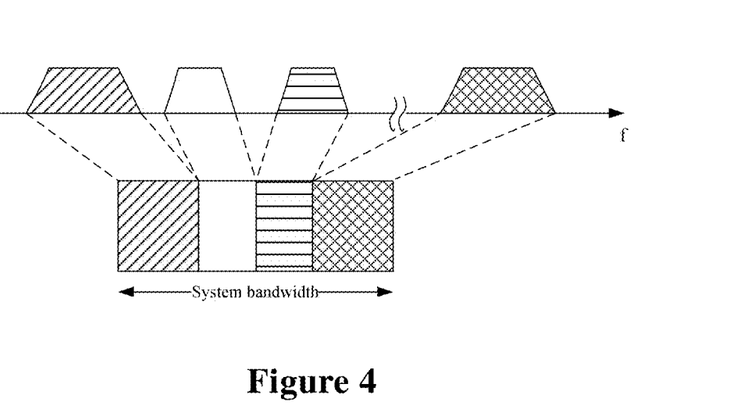
FIG. 4 is the schematic diagram for scenario of incontinuous carrier aggregation in prior art.

For LTE-Advanced (evolved LTE) system, it is necessary to connect the resources of multiple LTE carriers (also named component carrier) to support the system bandwidth which is wider than LTE system, such as 100 MHz, with two specific modes as below:

Mode I, Aggregate multiple continuous LTE carriers to provide greater transmission bandwidth for LTE-A;

Mode II, Aggregate multiple incontinuous LTE carriers to provide greater transmission bandwidth for LTE-A FIG. 4 refers to the schematic diagram for the scenario of incontinuous carrier aggregation.

At present, research trend of standardization organization is that carrier aggregation system reaches the following design agreement: design on each carrier keeps in step with LTE Release 8, so as to ensure the terminal of LTE R8 can work normally on each component carrier.

On the other hand, control scheme of PDCCH in LTE-A system mainly refers to the following modes:

Mode I, Independent Scheduling

Figure 5:
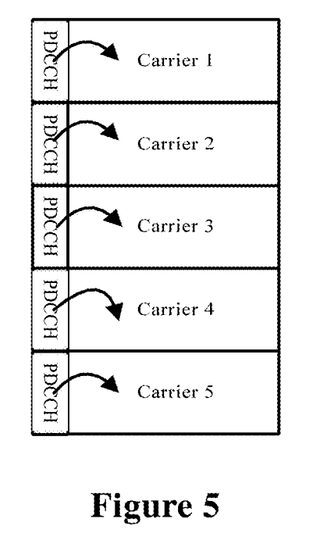
FIG. 5 is the schematic diagram for scenario of independent carrier scheduling in prior art.

Each carrier is scheduled independently, and cross-carrier scheduling is not supported. In such case, definition of PDCCH search space of each carrier is consistent with that in LTE R8. The schematic diagram is shown in FIG. 5.

Mode II, Cross-Carrier Scheduling

Figure 6:
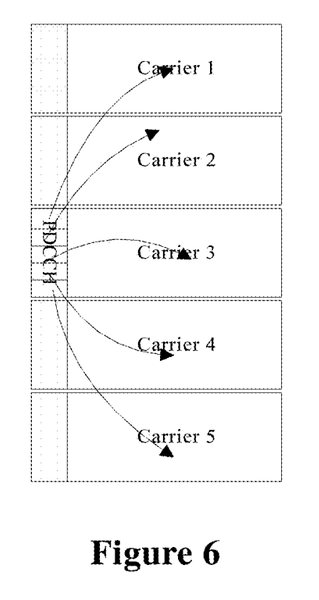
FIG. 6 is the schematic diagram for scenario of cross-carrier scheduling in prior art.

Other carriers can be scheduled by a carrier, with the schematic diagram as shown in FIG. 6.

In course of implementing the present invention, the inventor finds out there are at least the problems below in prior art:

In Rel-10, the RN is only applied to extending coverage, therefore, only one carrier is supported on Un link, R-PDCCH and PDSCH can only be scheduled on one CC (Component Carrier), while in Relay scheme designed in Rel-10, Un link throughput restricts the system performance, thus becoming the bottleneck to promote the whole network performance. To solve the transmission bottleneck of Un link, one way is to introduce multiple-carrier transmission onto Un link, which is similar to the CA (Carrier aggregation) technology used for high data rate of transmission between the base station in Rel-10 and UE. However, prior art and standard do not support such function.

SUMMARY OF THE PRESENT INVENTION

The embodiments of the present invention put forward the method and device for R-PDCCH transmission in the scenario of carrier aggregation, so as to solve the problem that information transmission between the base station and relay node through carrier aggregation technology is failed in prior art.

To achieve the purpose above, the embodiments of the present invention put forward a method for R-PDCCH transmission in the scenario of carrier aggregation, which comprises:

Relay node receives multiple aggregated component carriers sent by the base station, wherein said one or more component carriers carry R-PDCCH, and R-PDCCH corresponding to each component carrier is separately coded;

Said relay code carries out blind decoding on the component carrier carrying R-PDCCH, so as to acquire R-PDCCH which schedules each component carrier;

Said relay node acquires physical resources on corresponding component carrier according to said R-PDCCH, and carries out information transmission with said base station through said physical resources.

On the other hand, the embodiments of the present invention put forward a relay node, which comprises:

Receiving module, which is used to receive multiple aggregated component carriers sent by the base station, wherein said one or more component carriers carry R-PDCCH, and R-PDCCH corresponding to each component carrier is separately coded;

Acquisition module, which is used to carry out blind decoding on the received component carrier carrying R-PDCCH, so as to acquire R-PDCCH which schedules each component carrier;

Scheduling module, which is used to acquire physical resources on corresponding component carrier according to said R-PDCCH acquired by said acquisition module, and carry out information transmission with said base station through said physical resources.

Furthermore, the embodiments of the present invention put forward a method for R-PDCCH transmission in the scenario of carrier aggregation, which comprises:

Base station separately encodes the R-PDCCH corresponding to multi-aggregated component carriers sent to the relay node;

Said base station sends multi-aggregated component carriers to said relay node, wherein said one or more component carriers carry said R-PDCCH coded independently;

Information transmission is carried out between said base station and said relay node, and resources applied to said information transmission are acquired by said relay node according to said R-PDCCH coded independently in corresponding component carrier.

The embodiments of the present invention further provide a base station, which comprises:

Configuration module, which is used to separately encode the R-PDCCH corresponding to multi-aggregated component carriers sent to relay node;

Communication module, which is used to send multi-aggregated component carriers to said relay node, wherein said one or more component carriers carry said R-PDCCH coded independently, and carry out information transmission with said relay node; and the resources applied to said information transmission are acquired by said relay node according to said R-PDCCH coded independently in corresponding component carrier.

Compared with the present technology, the embodiments of the present invention at least possess the following advantages:

By the technical scheme of the embodiments of the present invention, multi-carrier aggregation transmission is supported between the relay node and the base station. The base station sends component carrier carrying R-PDCCH to the relay node, and schedules the resources in each component carrier through the R-PDCCH carried in component carrier, so as to achieve the communication between base station and relay node by multi-aggregated component carriers, thus enabling the link transmission resources between the base station relay node to support multi-carrier PDCCH scheduling, enhancing the transmission capability of link between the base station and relay node, and improving the system performance.

DETAILED DESCRIPTION OF THE EMBODIMENTS OF THE PRESENT INVENTION

The technical solutions in the present invention are explained in a detailed way with reference to the drawings and embodiments in the present invention:

As described in background of the invention, since data transmission between base station and relay node can only be achieved through single carrier in prior art, bottle neck is formed in system performance. However, prior art fails to support to apply carrier aggregation technology to achieve multi-carrier transmission in such context, therefore, it is urgent to design a scheme of applying carrier aggregation technology for such context, and establish corresponding control channel and resource scheduling mechanism.

To solve the above problems, embodiments of the present invention provide a method for R-PDCCH transmission in the scenario of carrier aggregation. Main technology of the scheme lies in that: apply the carrier aggregation technology to link communication between the base station and relay node, and carry corresponding R-PDCCH in each component carrier, so as to schedule corresponding resources in each component carrier, and finish information communication between the base station and relay node by corresponding resources, that is, carry out information transmission in backhaul link by multiple carries.

Figure 7:
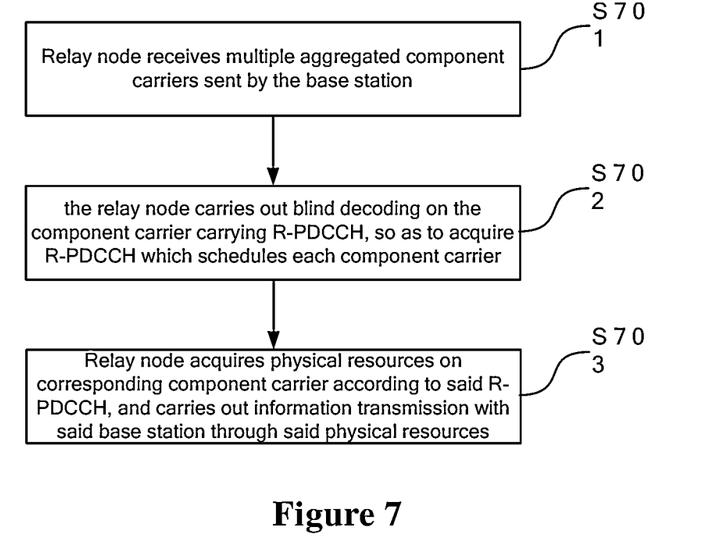
FIG. 7 is the flow diagram of the method for R-PDCCH transmission in the scenario of carrier aggregation provided in embodiments of the present invention.

As shown in FIG. 7, flow diagram of the method for R-PDCCH transmission in the scenario of carrier aggregation provided in embodiments of the present invention comprises the following steps specifically:

Step S701, relay node receives multi-aggregated component carriers sent from base station.

Wherein said one or more component carriers carry R-PDCCH, and R-PDCCH corresponding to each component carrier is separately coded.

Step S702, the relay node carries out blind decoding on the component carrier carrying R-PDCCH, so as to acquire R-PDCCH which schedules each component carrier.

Step S703, the relay node acquires physical resources on corresponding component carrier according to said R-PDCCH, and carries out information transmission with said base station through said physical resources.

In specific context scenario of implementation, the relay node acquires PDSCH (Physical Downlink Shared Channel) and/or PUSCH on corresponding component carrier according to R-PDCCH, and carries out information transmission with the base station through the PDSCH and/or PUSCH acquired.

In practical application context, for each component carrier in Step S701, the control scheme of R-PDCCH carried may comprise the two ways below:

Control Scheme I, Independent Scheduling

Relay node receives multi-aggregated component carriers corresponding to R-PDCCH sent from the base station, and R-PDCCH carried by each component carrier independently schedules the resources on each component carrier.

In the application context of such control scheme, process of Step S702 is specifically as below:

Said relay code carries out blind decoding on each component carrier, so as to acquire R-PDCCH information, and directly determines the R-PDCCH information acquired through blind decoding on each component carrier as the R-PDCCH scheduling the resources of each component carrier.

Said blind decoding process can be realized specifically through blind decoding on the search space in each component carrier respectively. Since R-PDCCH carried in each component carrier schedules the component carrier's resource independently, each search space carries R-PDCCH information directly without any other carrier identity information; the relay node acquires R-PDCCH information in the search space, and carries out resource scheduling to the component carrier according to the R-PDCCH information.

Control Scheme II, Cross-Carrier Scheduling

Relay node receives multi-aggregated component carriers sent from the base station, wherein said one component carrier carries R-PDCCH corresponding to itself and R-PDCCH corresponding to other component carriers, said R-PDCCH schedules the resources on component carrier and other component carriers in cross-carrier way.

In the scenario of applying such control scheme, the component carrier received by the relay node includes two types:

The first type carries the component carrier of R-PDCCH, and such R-PDCCH can not only schedule the resources in the component carrier, but also schedule the resources in other component carriers.

To realize accurate cross-carrier scheduling, R-PDCCH carried by the type of component carrier not only comprises multiple R-PDCCH information which schedules the resources on the component carrier and other component carriers respectively, furthermore, each R-PDCCH information comprises the identity information of component carrier where the scheduled resource exists.

Through such identity information, the relay node can determine the resources in which component carrier is specifically scheduled by each R-PDCCH.

The second type refers to the component carrier without R-PDCCH being carried, resources in such component carrier shall undergo cross-carrier scheduling through the R-PDCCH carried in the first type of component carrier.

For such type of component carrier, the base station shall pre-configure the identity information of component carrier where the R-PDCCH scheduling the component carrier exists, so as to enable the relay node to be capable of reversely searching the position of R-PDCCH scheduling the component carrier.

Therefore, application context of the cross-carrier scheduling control scheme further comprises the following processing flows before Step S701:

The relay node acquires corresponding relationship, configured by the base station, between the component carrier where the resources to be scheduled exist and the component carrier where R-PDCCH carrying the resources to be scheduled exist.

Furthermore, for the context of applying the cross-carrier scheduling control scheme, the process of Step S702 specifically comprises:

Said relay code carries out blind decoding on the component carrier carrying R-PDCCH, so as to acquire R-PDCCH information and identity information of the component carrier where the scheduled resources exist, and determines the corresponding R-PDCCH information as the R-PDCCH scheduling the component carrier and other component carriers according to the identity information.

In practical application context, the blind decoding on search space in the above Step S702 refers to the following two cases based on the sharing of search space:

Case I, when the component carrier carries R-PDCCH through multiple independent search spaces respectively, the relay node carries out blind decoding on each search space to acquire the R-PDCCH information carried in each search space and the identity information of the component carrier where the scheduled resources exist.

Case II, when the component carrier carries R-PDCCH through the shared search spaces, the relay node carries out blind decoding on the shared search space to acquire multiple R-PDCCH information carried in the search space and the identity information of the component carrier where the scheduled resources exist.

It shall be further noted that whatever control schemes are applied, in the component carrier carrying R-PDCCH, the R-PDCCH is carried through the information in search space; for the search space in each component carrier received, the relay node can be determined by the following ways:

The relay node acquires the transmission mode and aggregation level of R-PDCCH carried in the component carrier, wherein the transmission mode includes interleave mode and non-interleave mode;

The relay node determines the starting position of search space in each timeslot included in each subframe on the component carrier according to the transmission mode and aggregation level of R-PDCCH.

According to the difference in transmission mode, starting position of the search space above can be determined as below:

(1) If the transmission mode of R-PDCCH refers to interleave mode, the relay node determines the starting position of search space via the formula below:

$$L \cdot \{(Y_k + m') \bmod \lfloor N_{CCE,j}^{R\text{-}PDCCH}/L \rfloor\} + i, i = 0, 1, \ldots, L-1,$$

Where, L is the aggregation level of R-PDCCH;

$N_{CCE,j}^{R\text{-}PDCCH}$ PDCCH is the number of logical CCEs included in the pre-configured possible transmission resource set of R-PDCCH, k is the number of current subframe, and j is the number of current timeslot in the subframe, j∈{0,1};

When the R-PDCCH carried by each component carrier schedules the resources on each component carrier independently, m'=m, when R-PDCCH schedules the resources on the component carrier and other component carriers in cross-carrier way, m'=m+M (L)·$n_{CI}$, m is the number of blind decodings, and $n_{CI}$ is the identity information of the component carrier where the resources scheduled by R-PDCCH exist;

$Y_k=(A·Y_{k-1})$ mod D, $Y_{-1}=n_{RNTI}\neq 0$, $n_{RNTI}$ is RNTI of relay node, A=39827, D=65537, k=$\lfloor n_s/2 \rfloor$, $n_s$ is the timeslot number in current radio frame.

(2) If the transmission mode of R-PDCCH refers to non-interleave mode, the relay node determines the starting position of search space via the formula below:

$$(L·m'+i) \bmod N_{VRB}^{R-PDCCH}, i=0,1,\ldots,L-1,$$

Where, L is the aggregation level of R-PDCCH;

$N_{VRB}^{R-PDCCH}$ is the number of VRBs included in possible transmission resources set of R-PDCCH;

When the R-PDCCH carried by each component carrier schedules the resources on each component carrier independently, m'=m, when R-PDCCH schedules the resources on the component carrier and other component carriers in cross-carrier way, m'=m+M(L)·$n_{CI}$, m is the number of blind decodings, and $n_{CI}$ is the identity information of the component carrier where the resources scheduled by R-PDCCH exist.

Figure 8:
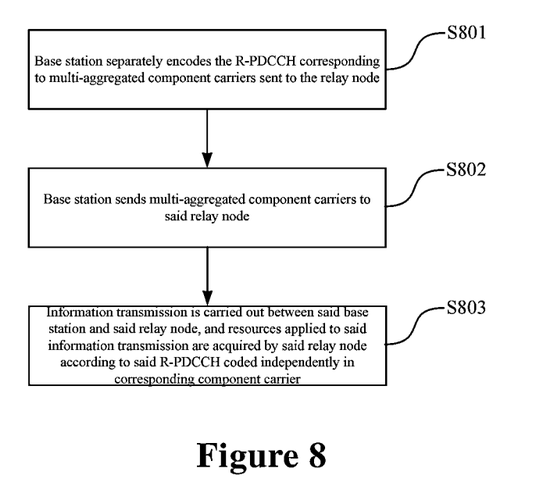
FIG. 8 is the flow diagram of the method for R-PDCCH transmission at base side in the scenario of carrier aggregation provided in embodiments of the present invention.

The process above is the realization flow of the method for R-PDCCH transmission in the scenario of carrier aggregation provided in the embodiments of the present invention; and the followings are the realization flow of the method for R-PDCCH transmission at base side in the scenario of carrier aggregation provided in embodiments of the present invention, as shown in FIG. 8 with specific steps below:

Step S801, the base station separately encodes the R-PDCCH corresponding to multi-aggregated component carriers sent to the relay node.

Step S802, the base station sends multi-aggregated component carriers to said relay node.

Wherein said one or more component carriers carry the R-PDCCH independently encoded.

Step S803, information transmission is carried out between the base station and relay node, resources applied in the information transmission are acquired by the relay node in corresponding component carrier according to the R-PDCCH independently encoded.

Corresponding to the contents in Step S701 above mentioned, in Step S802, the control scheme that the base station sends the R-PDCCH carried in multi-component carriers sent to the relay node comprises two ways below:

Control Scheme I, Independent Scheduling

The base station sends multi-aggregated component carriers corresponding to R-PDCCH to the relay node, and R-PDCCH carried by each component carrier independently schedules the resources on each component carrier.

In such control scheme, the base station carries R-PDCCH in the sent component carrier through the search space respectively.

Control Scheme II, Cross-Carrier Scheduling

The base station sends multi-aggregated component carriers to the relay node, wherein said one component carrier carries R-PDCCH corresponding to itself and R-PDCCH corresponding to other component carriers, said R-PDCCH schedules the resources on component carrier and other component carriers in cross-carrier way.

In the scenario of applying such control scheme, the component carrier sent by the base station also includes two types:

The first type carries the component carrier of R-PDCCH, and such R-PDCCH can not only schedule the resources in the component carrier, but also schedule the resources in other component carriers.

To realize accurate cross-carrier scheduling, R-PDCCH carried by the type of component carrier not only comprises multiple R-PDCCH information which schedules the resources on the component carrier and other component carriers respectively, each R-PDCCH information comprises the identity information of component carrier where the scheduled resource exists.

The second type refers to the component carrier without R-PDCCH being carried, resources in such component carrier shall undergo cross-carrier scheduling through the R-PDCCH carried in the first type of component carrier.

For such type of component carrier, the base station shall pre-configure the identity information of component carrier where the R-PDCCH scheduling the component carrier exists, so as to enable the relay node to be capable of reversely searching the position of R-PDCCH scheduling the component carrier.

Therefore, application context of the cross-carrier scheduling control scheme further comprises the following processing flows before Step S802:

The base station configures, for the relay node, corresponding relationship between the component carrier where the resources to be scheduled exist and the component carrier where R-PDCCH carrying the resources to be scheduled exist.

Moreover, since corresponding configurations of search space in each component carrier received by the relay node are all completed in each component carrier by the base station before sending component carrier, the relay node just carries out reverse resolution, to ensure smooth resolution of the relay node, the configuration strategy for search space applied to the base station side shall be consistent with that to the relay node side.

In conclusion, refer to the specification of related contents in Step S701 to Step S703 above mentioned for the shared strategy for search space applied to the base station side and the determination mode for starting position of the search space, which will not be repeated any more.

Compared with the present technology, the embodiments of the present invention possess the following advantages:

By the technical scheme of the embodiments of the present invention, multi-carrier aggregation transmission is supported between the relay node and the base station. The base station sends component carrier carrying R-PDCCH to the relay node, and schedules the resources in each component carrier through the R-PDCCH carried in component carrier, so as to achieve the communication between base station and relay node by multi-aggregated component carriers, thus enabling the link transmission resources between the base station relay node to support multi-carrier PDCCH scheduling, enhancing the transmission capability of link between the base station and relay node, and improving the system performance.

Technical scheme provided in the embodiments of the present invention will be specified below in combination with specific application context.

Embodiments of the present invention put forward a R-PDCCH design scheme for supporting multi-carrier transmission on the backhaul link between the base station and relay node in the scenario of relay node existing.

Figure 9:
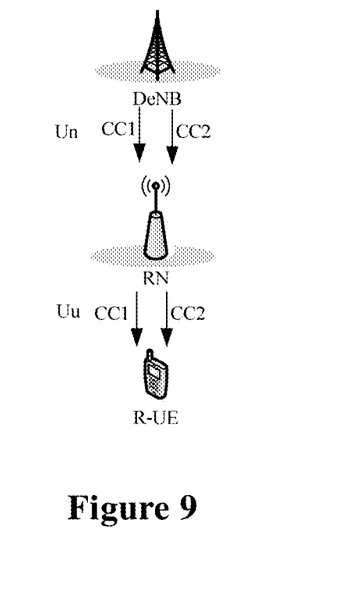
FIG. 9 is the network architecture diagram of a multi-carrier Relay deployment scheme provided in embodiments of the present invention.

As shown in FIG. 9, embodiments of the present invention provide a deployment scheme for multi-carrier Relay, wherein both the Un link (backhaul link) and Uu link (access link) adopt two-carrier transmission, as shown in CC1 (Component Carrier) and CC2 in the figure.

In the application scenario above, for the scheduling of R-PDCCH, two possible technical schemes exist, embodiments of the present invention explain with two application contexts below to facilitate the description:

Application Context I

Figure 10:
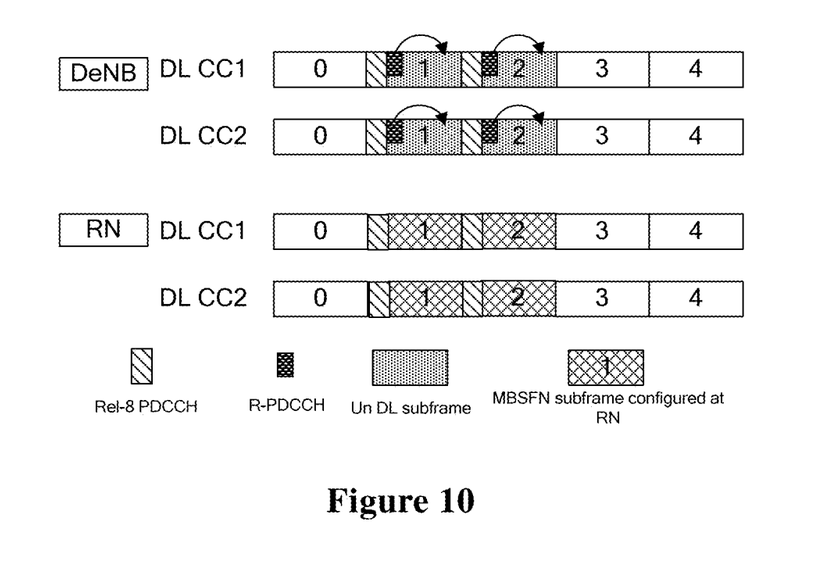
FIG. 10 is the context diagram for independent scheduling of each component carrier on Un link provided in embodiments of the present invention.

In the application context, each component carrier on Un link is independently scheduled (i.e. control scheme I above mentioned), schematic diagram of the application context is shown in FIG. 10, R-PDCCH in downlink of each Un link is only used to schedule Un PDSCH of the component carrier, similarly, PUSCH scheduling on the component carrier also adopts the same scheme.

Specifically, when RN is not configured to carry out cross-carrier scheduling, on each component carrier, RN carries out R-PDCCH blind decoding completely the same as Rel-10 in DL backhaul subframe, and the R-PDCCH information format in blind decoding does not comprise indication information of carrier number.

Application Context II

Figure 11:
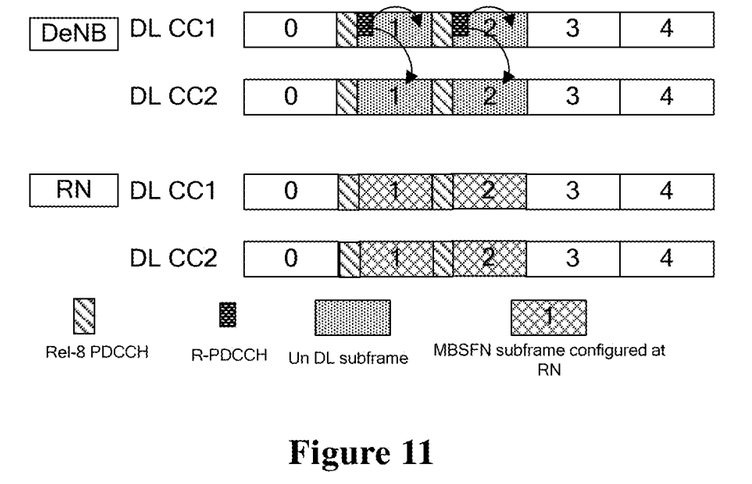
FIG. 11 is the context diagram for cross-carrier scheduling of each component carrier on Un link provided in embodiments of the present invention.

In the application context, cross-carrier scheduling mode (namely control scheme II above mentioned) is adopted on Un link, the R-PDCCH on a component carrier can schedule Un PDSCH or PUSCH resources of other component carriers, as shown in FIG. 11.

In such application context, R-PDCCH information shall include the number of carrier where Un PDSCH/PUSCH to be scheduled exists, viz. CIF (Carrier Indication Field). Under cross-carrier scheduling situation, RN acquires the link relationship, from the base station, between Un PDSCH/PUSCH CC and the component carrier where corresponding R-PDCCH exists, and carries out blind decoding on R-PDCCH in corresponding R-PDCCH carrier.

Under cross-carrier scheduling situation, multiple R-PDCCHs corresponding to Un PDSCH CC exist on one component carrier, on which the R-PDCCHs can be carried through multiple independent search spaces or a shared search space. Taking the R-PDCCH carrying two component carriers as the example, scenario diagrams of independent and shared search spaces are respectively shown in FIG. 12 and FIG. 13.

Figure 12:
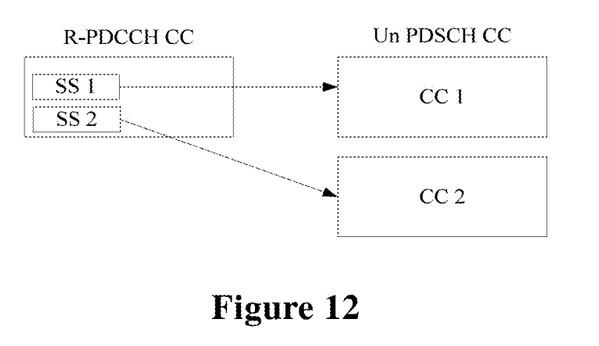
FIG. 12 is the context diagram for independent search space provided in embodiments of the present invention.

Under independent search space situation, in the R-PDCCH VRB set of DL backhaul subframe, each R-PDCCH aggregation level witnesses multiple different search spaces, the blind decoding of RN in each search space is similar to that of Rel-10 under single-carrier situation, the former only carries out blind decoding on an R-PDCCH, the difference lie in that the R-PDCCH information undergoing blind decoding comprises indication information of carrier number (namely CIF mentioned above).

Figure 13:
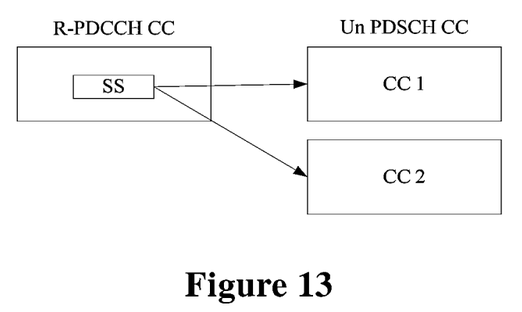
FIG. 13 is the context diagram for shared search space provided in embodiments of the present invention.

Under shared search space situation, in the R-PDCCH VRB set of DL backhaul subframe, each R-PDCCH aggregation level only witnesses one search space, the blind decoding of RN in the search space is different from that of Rel-10 under single-carrier situation, the difference lie in that RN shall carry out blind decoding on multiple R-PDCCHs, respectively corresponding to different Un PDSCH/PUSCH CC, meanwhile, the format of R-PDCCH information undergoing blind decoding by RN comprises indication information of carrier number (namely CIF above mentioned).

Specifically, with regard to the determination of R-PDCCH search space under the multi-carrier situation above, embodiments of the present invention provide the specific design as below for independent search space:

(1) If R-PDCCH refers to interleave mode, in DL backhaul subframe k, for each slot (j=0 or 1), at each R-PDCCH aggregation level, L∈{1, 2, 4, 8}, shall carry out R-PDCCH blind decodings for m=0, 1, . . . , M(L)−1 times, and the starting position of R-PDCCH undergoing each blind decoding is determined by the following formula:

$$L \cdot \{(Y_k + m') \bmod \lfloor N_{CCE,j}^{R\text{-}PDCCH}/L \rfloor\} + i,$$
$$i = 0, 1, \ldots, L-1,$$

When RN is not configured to carry out cross-carrier scheduling on the R-PDCCH carrier, m'=m, when RN is configured to carry out cross-carrier scheduling on the R-PDCCH carrier, m+=m+M(L)·$n_{CI}$, wherein $n_{CI}$ is the carrier number of CC where the scheduled PDSCH/PUSCH exists, viz. CIF.

In the formula above, $N_{CCE,j}^{R\text{-}PDCCH}$ is the number of logical CCEs included in pre-configured R-PDCCH VRB set, $Y_k$ is Hashing function, specially as below:

$$Y_k = (A \cdot Y_{k-1}) \bmod D$$

Where, $Y_{-1} = n_{RNTI} \neq 0$, $n_{RNTI}$ is RNTI) of relay node, A=39827, D=65537 k=$\lfloor n_s/2 \rfloor$, and $n_s$ is the timeslot number in current radio frame.

(2) If R-PDCCH refers to non-interleave mode, in DL backhaul subframe, for each slot, at each R-PDCCH aggregation level, L∈{1, 2, 4, 8}, RN shall carry out R-PDCCH blind decodings for m=0, 1, . . . , M(L)−1 times, and the starting position of R-PDCCH undergoing each blind decoding is determined by the following formula:

$$(L \cdot m' + i) \bmod N_{VRB}^{PDCCH}, i = 0, 1, \ldots, L-1,$$

When RN is not configured to carry out cross-carrier scheduling on the R-PDCCH carrier, m'=m, when RN is configured to carry out cross-carrier scheduling on the R-PDCCH carrier, m'=m+M(L)·$n_{CI}$, wherein $n_{CI}$ is the carrier number of CC where the scheduled PDSCH/PUSCH exists, viz. CIF.

Where, $N_{VRB}^{R\text{-}PDCCH}$ is the number of VRBs included in R-PDCCH VRB set, definitions of other parameters in the formula are the same as those in the interleave mode above, which will not be repeated below.

Compared with the present technology, the embodiments of the present invention possess the following advantages:

By the technical scheme of the embodiments of the present invention, multi-carrier aggregation transmission is supported between the relay node and the base station. The base station sends component carrier carrying R-PDCCH to the relay node, and schedules the resources in each component carrier through the R-PDCCH carried in component carrier, so as to achieve the communication between base station and relay node by multi-aggregated component carriers, thus enabling the link transmission resources between the base station relay node to support multi-carrier PDCCH scheduling, enhancing the transmission capability of link between the base station and relay node, and improving the system performance.

Figure 14:
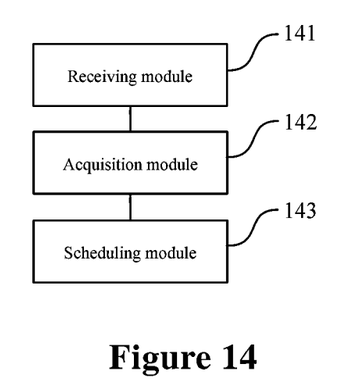
FIG. 14 is the structural diagram for relay node provided in embodiments of the present invention.

To realize the technical scheme, the embodiments of the present invention further provide a relay node, with the structural diagram as shown in FIG. 14, which specifically comprises:

Receiving module 141, which is used to receive multiple aggregated component carriers sent by the base station, wherein said one or more component carriers carry R-PDCCH, and R-PDCCH corresponding to each component carrier is separately coded;

Acquisition module 142, which is used to carry out blind decoding on component carrier carrying R-PDCCH received by receiving module 141, so as to acquire R-PDCCH which schedules each component carrier;

Scheduling module 143, which is used to acquire physical resources on corresponding component carrier according to said R-PDCCH acquired by said acquisition module 142, and carry out information transmission with said base station through said physical resources.

Wherein the receiving module 141 is specifically used to:

Receive multi-aggregated component carriers corresponding to R-PDCCH sent from the base station, wherein the R-PDCCH carried by each component carrier independently schedules the resources on each component carrier; or, Receive multi-aggregated component carriers sent from the base station, wherein said one component carrier carries R-PDCCH corresponding to itself and R-PDCCH corresponding to other component carriers, said R-PDCCH schedules the resources on component carrier and other component carriers in cross-carrier way.

Furthermore, when the R-PDCCH carried by each component carrier received by the receiving module 141 independently schedules the resources on each component carrier, the acquisition module 142 is specifically used to:

Carry out blind decoding on the search space in each component carrier to acquire R-PDCCH information carried in each search space, and directly determine the R-PDCCH information acquired through blind decoding on each component carrier as the R-PDCCH scheduling each component carrier itself.

On the other hand, when the R-PDCCH carried in the component carrier received by the receiving module 141 schedules the resources on the component carrier and other component carriers in cross-carrier way, the acquisition module 142 is further used to:

Acquire corresponding relationship, configured by the base station, between the component carrier where the resources to be scheduled exist and the component carrier where R-PDCCH carrying the resources to be scheduled exist.

Furthermore, when the R-PDCCH carried in the component carrier received by the receiving module 141 schedules the resources on the component carrier and other component carriers in cross-carrier way, R-PDCCH specifically comprises multiple R-PDCCH information which schedules the resources on the component carrier and other component carriers respectively, wherein the R-PDCCH information comprises the identity information of component carrier where the scheduled resource exists.

Wherein, when the R-PDCCH carried in the component carrier received by the receiving module 141 schedules the resources on the component carrier and other component carriers in cross-carrier way, the acquisition module 142 is specifically used to:

Carry out blind decoding on each search space to acquire the R-PDCCH information carried in each search space and the identity information of the component carrier where the scheduled resources exist when the component carrier received by the receiving module 141 carries R-PDCCH through multiple independent search spaces respectively;

Carry out blind decoding on the shared search space to acquire multiple R-PDCCH information carried in the search space and the identity information of the component carrier where the scheduled resources exist when the component carrier received by the receiving module 141 carries said R-PDCCH through the shared search spaces.

Figure 15:
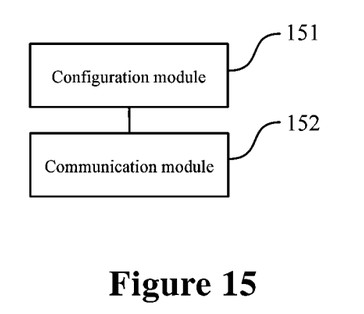
FIG. 15 is the structural diagram for base station provided in embodiments of the present invention.

On the other hand, embodiments of the present invention provide a base station, with the structural diagram as shown in FIG. 15, comprising:

Configuration module 151, which is used to separately encode the R-PDCCH corresponding to multi-aggregated component carriers sent to the relay node;

Communication module 152, which is used to send multi-aggregated component carriers to said relay node, wherein, said one or more component carriers carry said R-PDCCH coded independently by configuration module 151, and carry out information transmission with the relay node. Resources applied to information transmission are acquired by the relay node in corresponding component carrier of R-PDCCH coded independently.

Wherein, the communication module 152 is specifically used to:

Send multi-aggregated component carriers corresponding to R-PDCCH to the relay node, wherein said R-PDCCH carried by each component carrier independently schedules the resources on each component carrier; or, Send multi-aggregated component carriers to the relay node, wherein said one component carrier carries R-PDCCH corresponding to itself and R-PDCCH corresponding to other component carriers, said R-PDCCH schedules the resources on component carrier and other component carriers in cross-carrier way.

When the R-PDCCH carried in the component carrier sent by said communication module 152 schedules the resources on the component carrier and other component carriers in cross-carrier way, said configuration module 151 is further used to:

Configure corresponding relationship, for the relay node, between the component carrier where the resources to be scheduled exist and the component carrier where R-PDCCH carrying the resources to be scheduled exist.

When the R-PDCCH carried in the component carrier sent by said communication module 152 schedules the resources on the component carrier and other component carriers in cross-carrier way, R-PDCCH carried in component carrier sent by said communication module 152 to said relay node specifically comprises:

Multiple R-PDCCH information scheduling the resources on said component carrier and other component carriers respectively;

Wherein, said R-PDCCH information comprises the identity information of component carrier where the scheduled resource exists.

Furthermore, the configuration module 151 is further used to:

Acquire the transmission mode and aggregation level of R-PDCCH carried in the component carrier, wherein the transmission mode includes interleave mode and non-interleave mode;

Determine the starting position of search space in each timeslot included in each subframe on the component carrier according to the transmission mode and aggregation level of said R-PDCCH.

Compared with the present technology, the embodiments of the present invention possess the following advantages:

By the technical scheme of the embodiments of the present invention, multi-carrier aggregation transmission is supported between the relay node and the base station. The base station sends component carrier carrying R-PDCCH to the relay node, and schedules the resources in each component carrier through the R-PDCCH carried in component carrier, so as to achieve the communication between base station and relay node by multi-aggregated component carriers, thus enabling the link transmission resources between the base station relay node to support multi-carrier PDCCH scheduling, enhancing the transmission capability of link between the base station and relay node, and improving the system performance.

Through the description of the embodiments above, the technical personnel in this field can understand clearly that the present invention can be implemented by hardware or software and necessary current hardware platform. Based on this understanding, the technical scheme of the present invention can be embodied by a form of software products which can be stored in a nonvolatile storage medium (such as CD-ROM, U disk, mobile hard disk, etc.), including a number of instructions for making a computer device (such as personal computers, servers, or network equipment, etc.) implement the methods described in the embodiments of the present invention.

The technical personnel in this field can be understood that the illustration is only schematic drawings of a preferred embodiment, and the module or process is not necessary for the implementation of the present invention.

The technical personnel in this field can be understood that the modules can be distributed in device of the embodiments according to the description of the embodiments above, and also can be varied in one or multiply devices of the embodiments. The modules of the embodiments can be combined into a module, and also can be further split into several sub-modules.

The number of the embodiments is only to describe, it does not represent the pros and cons of the embodiments.

The descriptions above are just preferred implement ways of the present invention. It should be pointed that, for general technical personnel in this field, some improvement and decorating can be done, which should be as the service limit scope of the present invention.

The invention claimed is:

1. A method for Relay-Physical Downlink Control Channel (R-PDCCH) transmission in a carrier aggregation scenario, the method comprising:
receiving, at a relay node, multiple aggregated component carriers sent by a donor base station, one or more of the component carriers carrying R-PDCCH, R-PDCCH corresponding to each of the component carriers being separately coded;
carrying out blind decoding, by said relay node, on the component carriers carrying R-PDCCH, so as to acquire R-PDCCH which is used to schedule each of the component carriers; and
acquiring physical resources, by said relay node, on the corresponding component carriers according to said R-PDCCH, and carrying out information transmission with said base station through said physical resources, wherein the method further comprises:
for the one or more component carriers carrying the R-PDCCH, and the R-PDCCH corresponding to each component carrier being separately coded, said relay node receiving multi-aggregated component carriers corresponding to the R-PDCCH sent from the donor base station, and the R-PDCCH being carried by each component carrier to independently schedule the resources on each component carrier, or said relay node receiving multi-aggregated component carriers sent from the donor base station, one component carrier carries R-PDCCH corresponding to itself and R-PDCCH corresponding to other component carriers, and said R-PDCCH schedules the resources on the component carriers in a cross-carrier way, and
if the transmission mode of the R-PDCCH refers to an interleave mode, determining, by the relay node, a starting position of search spaces in each timeslot included in each subframe on the component carriers according to the transmission mode and aggregation level of the R-PDCCH, by:
said relay node determining the starting position of the search spaces via the formula below:

$$L \cdot \{(Y_k + m') \bmod \lfloor N_{CCE,j}^{R\text{-}PDCCH}/L \rfloor\} + i, i = 0,1,\ldots,L-1,$$

where, L is the aggregation level of R-PDCCH;
$N_{CCE,j}^{R\text{-}PDCCH}$ is the number of logical CCEs (Control Channel Element) included in the pre-configured possible transmission resource set of R-PDCCH, k is the number of a current subframe, and j is the number of a current timeslot in the subframe, $j \in \{0,1\}$;
when the R-PDCCH carried by each of the component carriers is used to schedule the resources on each of the component carriers independently, m'=m, when R-PDCCH is used to schedule the resources on the one of the component carriers and the other ones of the component carriers in the cross-carrier way, m'=m+M (L)·$n_{CI}$, m is the number of blind decodings, and $n_{CI}$ is the identity information of the respective component carrier where the resources scheduled by R-PDCCH exist;
$Y_k = (A \cdot Y_{k-1}) \bmod D$, $Y_{-1} = n_{RNTI} \neq 0$, $n_{RNTI}$ is RNTI of relay node, A=39827, D=65537, k=$\lfloor n_s/2 \rfloor$, $n_s$ is the timeslot number in a current radio frame;
if the transmission mode of said R-PDCCH refers to a non-interleave mode, said relay node determining the starting position of the search spaces in each timeslot included in each subframe on the component carriers according to the transmission mode and aggregation level of R-PDCCH, by:
said relay node determining the starting position of the search spaces via the formula below:

$$(L \cdot m' + i) \bmod N_{VRB}^{R\text{-}PDCCH}, i=0,1,\ldots,L-1,$$

where, L is the aggregation level of R-PDCCH;
$N_{VRB}^{R\text{-}PDCCH}$ is the number of VRBs included in possible transmission resources set of R-PDCCH; and
when the R-PDCCH carried by each of the component carriers is used to schedule the resources on each of the component carriers independently, m'=m, when R-PDCCH schedules the resources on the one of the component carriers and the other ones of the component carriers in the cross-carrier way, m'=m+M(L)·$n_{CI}$, m is the number of blind decodings, and $n_{CI}$ is the identity information of the respective component carrier where the resources scheduled by R-PDCCH exist.

2. The method according to claim 1, wherein, when said R-PDCCH is used to schedule the resources on the one of the component carriers and other ones of the component carriers in the cross-carrier way, before said relay node receives multi-aggregated component carriers sent from the base station, the method further comprises: acquiring a corresponding relationship, at said relay node, configured by the base station, between the component carriers where the resources to be scheduled exist and the component carriers where R-PDCCH carrying the resources to be scheduled exist.

3. The method according to claim 2, wherein at least one of:
when the R-PDCCH is carried by each of the component carriers and is used to schedule the resources on said component carriers independently, said relay node carrying out blind decoding on each of the component carriers, so as to acquire R-PDCCH information, which comprises said relay node carrying out blind decoding on the search space in each of the component carriers to acquire R-PDCCH information carried in each search space; and
when said R-PDCCH is used to schedule the resources on the one of the component carriers and the other ones of the component carriers in the cross-carrier way, said relay node carries out blind decoding on the component carriers carrying R-PDCCH, so as to acquire R-PDCCH information and identity information of the component carriers where the scheduled resources exist, which comprises at least one of:
when said component carriers carry said R-PDCCH through multiple independent search spaces respectively, said relay node carries out blind decoding on each of the search spaces to acquire the R-PDCCH information carried in each of the search spaces and the identity information of the component carriers where the scheduled resources exist; and
when said component carriers carry R-PDCCH through the shared search spaces, the relay node carries out blind decoding on the shared search spaces to acquire multiple R-PDCCH information carried in the search spaces and the identity information of the component carriers where the scheduled resources exist.

4. The method according to claim 3, wherein said search spaces of the component carriers are determined in at least one of the following ways:
said relay node acquiring the transmission mode and the aggregation level of the R-PDCCH carried in the component carriers, the transmission mode including the interleave mode and the non-interleave mode; and
said relay node determining the starting position of the search spaces in each timeslot included in each subframe on the component carriers according to the transmission mode and aggregation level of the R-PDCCH.

5. The method according to claim 1, wherein at least one of:
when the R-PDCCH is carried by each of the component carriers and is used to schedule the resources on said component carriers independently, said relay node carries out blind decoding on the component carriers carrying R-PDCCH, so as to acquire R-PDCCH which is used to schedule each of the component carriers, which comprises said relay node carrying out blind decoding on each of the component carriers, so as to acquire R-PDCCH information, and directly determining the R-PDCCH information acquired through blind decoding on each of the component carriers as the R-PDCCH is used to schedule the resources of the corresponding component carrier;
when said R-PDCCH is used to schedule the resources on the one of the component carriers and the other component carriers in the cross-carrier way, in said R-PDCCH, the method comprises multiple R-PDCCH information being used to schedule the resources on said one of the component carriers and the other ones of the component carriers, respectively, said R-PDCCH information comprising the identity information of the component carriers where the scheduled resource exists; and
when said R-PDCCH is used to schedule the resources on the one of the component carriers and the other ones of the component carriers in the cross-carrier way, said relay node carries out blind decoding on the component carriers carrying R-PDCCH, so as to acquire R-PDCCH which is used to schedule each of the component carriers, which comprises said relay node carrying out blind decoding on the component carriers carrying R-PDCCH, so as to acquire R-PDCCH information and identity information of the component carriers where the scheduled resources exist, and determine the corresponding R-PDCCH information as the PDCCH used to schedule the one of the component carriers and other component carriers according to the identity information.

6. The method according to claim 1, wherein said relay node acquires physical resources on the corresponding component carriers according to said R-PDCCH, and carries out information transmission with said base station through said physical resources, by: said relay node acquiring PDSCH and/or PUSCH on the corresponding component carriers according to R-PDCCH, and carrying out information transmission with the base station through the PDSCH and/or PUSCH acquired.

7. A relay node comprising a hardware processor configured to:
receive multiple aggregated component carriers sent by a donor base station, one or more of the component carriers carrying R-PDCCH, R-PDCCH corresponding to each of the component carriers being separately coded;
carry out blind decoding on the component carriers carrying R-PDCCH, so as to acquire R-PDCCH which is used to schedule each of the component carriers; and
acquire physical resources on the corresponding component carriers according to said R-PDCCH, and carry out information transmission with said base station through said physical resources, wherein the hardware processor is further configured to:
for the one or more component carriers carrying the R-PDCCH, and the R-PDCCH corresponding to each component carrier being separately coded, receive multi-aggregated component carriers corresponding to the R-PDCCH sent from the donor base station, and the R-PDCCH being carried by each component carrier to independently schedule the resources on each component carrier, or receive multi-aggregated component carriers sent from the donor base station, one component carrier carries R-PDCCH corresponding to itself and R-PDCCH corresponding to other component carriers, and said R-PDCCH schedules the resources on the component carriers in a cross-carrier way, and
if the transmission mode of the R-PDCCH refers to an interleave mode, determining, by the relay node, a starting position of search spaces in each timeslot included in each subframe on the component carriers according to the transmission mode and aggregation level of the R-PDCCH, by:
said relay node determining the starting position of the search spaces via the formula below:

$$L \cdot \{(Y_k + m') \bmod \lfloor N_{CCE,j}^{R\text{-}PDCCH}/L \rfloor\} + i, i = 0, 1, \ldots, L-1,$$

where, L is the aggregation level of R-PDCCH;

$N_{CCE,j}^{R-PDCCH}$ is the number of logical CCEs (Control Channel Element) included in the pre-configured possible transmission resource set of R-PDCCH, k is the number of a current subframe, and j is the number of a current timeslot in the subframe, $j \in \{0,1\}$;

when the R-PDCCH carried by each of the component carriers is used to schedule the resources on each of the component carriers independently, m'=m, when R-PDCCH is used to schedule the resources on the one of the component carriers and the other ones of the component carriers in the cross-carrier way, m'=m+M (L)·$n_{CI}$, m is the number of blind decodings, and $n_{CI}$ is the identity information of the respective component carrier where the resources scheduled by R-PDCCH exist;

$Y_k = (A \cdot Y_{k-1}) \mod D$, $Y_{-1} = n_{RNTI} \neq 0$, $n_{RNTI}$ is RNTI of relay node, A=39827, D=65537, $k = \lfloor n_s/2 \rfloor$, $n_s$ is the timeslot number in a current radio frame;

if the transmission mode of said R-PDCCH refers to a non-interleave mode, said relay node determining the starting position of the search spaces in each timeslot included in each subframe on the component carriers according to the transmission mode and aggregation level of R-PDCCH, by:

said relay node determining the starting position of the search spaces via the formula below:

$$(L \cdot m' + i) \mod N_{VRB}^{R-PDCCH}, i=0,1,\ldots,L-1,$$

where, L is the aggregation level of R-PDCCH;

$N_{VRB}^{R-PDCCH}$ is the number of VRBs included in possible transmission resources set of R-PDCCH;

when the R-PDCCH carried by each of the component carriers is used to schedule the resources on each of the component carriers independently, m'=m, when R-PDCCH schedules the resources on the one of the component carriers and the other ones of the component carriers in the cross-carrier way, m'=m+M (L)·$n_{CI}$, m is the number of blind decodings, and $n_{CI}$ is the identity information of the respective component carrier where the resources scheduled by R-PDCCH exist.

8. The relay node according to claim 7, wherein, when the R-PDCCH carried by each of the component carriers received by said receiving module is used to schedule the resources on said one of the component carriers and the other ones of the component carriers in the cross-carrier way, said acquisition module is further used to: acquire a corresponding relationship, configured by the base station, between the component carriers where the resources to be scheduled exist and the component carriers where R-PDCCH carrying the resources to be scheduled exist.

9. The relay node according to claim 7, wherein at least one of:

when the R-PDCCH carried by each of the component carriers received by said receiving module independently is used to schedule the resources on each of the component carriers, said acquisition module is used to carry out blind decoding on a search space in each of the component carriers to acquire R-PDCCH information carried in each search space, and directly determine the R-PDCCH information acquired through blind decoding on each of the component carriers as the R-PDCCH scheduling each component carrier itself; and when the R-PDCCH carried by said component carriers received by said receiving module is used to schedule the resources on said one of the component carriers and the other ones of the component carriers in the cross-carrier way, said R-PDCCH comprises multiple R-PDCCH information which is used to schedule the resources on said one of the component carriers and the other ones of the component carriers respectively, said R-PDCCH information comprising the identity information of component carriers where the scheduled resource exists, wherein when the R-PDCCH carried by said component carriers received by said receiving module is used to schedule the resources on said one of the component carriers and the other ones of the component carriers in the cross-carrier way, said acquisition module is used to at least one of:

carry out blind decoding on each of the search spaces to acquire the R-PDCCH information carried in each of the search spaces and the identity information of the component carriers where the scheduled resources exist when the component carriers received by the receiving module carry R-PDCCH through multiple independent search spaces, respectively; and carry out blind decoding on the shared search spaces to acquire multiple R-PDCCH information carried in the search spaces and the identity information of the component carriers where the scheduled resources exist when the component carriers received by the receiving module carry said R-PDCCH through the shared search spaces.

10. A method for Relay-Physical Downlink Control Channel (R-PDCCH) transmission in a carrier aggregation scenario, the method comprising:

separately encoding, at a base station, R-PDCCH corresponding to multi-aggregated component carriers sent to a relay node;

sending multi-aggregated component carriers from the base station to said relay node, one or more of the component carriers carrying said R-PDCCH coded independently;

carrying out information transmission between said base station and said relay node; and acquiring resources applied to said information transmission by said relay node according to said R-PDCCH coded independently in corresponding component carriers, wherein for the one or more component carriers carrying the carry the R-PDCCH coded independently, the method specifically comprises:

said base station sending multi-aggregated component carriers corresponding to the R-PDCCH to the relay and the R-PDCCH carried by each component carrier is used to independently schedule the resources on each component carrier; or said base station sending multi-aggregated component carriers to the relay node, wherein said one component carrier carries the R-PDCCH corresponding to itself and the R-PDCCH corresponding to other component carriers, said R-PDCCH scheduling the resources on the component carriers in a cross-carrier way; and if the transmission mode of the R-PDCCH refers to an interleave mode, determining, by the relay node, a starting position of the search spaces in each timeslot included in each subframe on the component carriers according to a transmission mode and an aggregation level of the R-PDCCH, by:

said base station determining the starting position of the search spaces via the formula below:

$$L \cdot \{(Y_k+m') \bmod \lfloor N_{CCE,j}^{R\text{-}PDCCH}/L \rfloor\} + i, i = 0,1,\ldots,L-1,$$

where, L is the aggregation level of R-PDCCH;
$N_{CCE,j}^{R\text{-}PDCCH}$ is the number of logical CCEs (Control Channel Elements) included in the pre-configured possible transmission resource set of R-PDCCH, k is the number of a current subframe, and j is the number of a current timeslot in the subframe, $j \in \{0,1\}$;
when the R-PDCCH carried by each of the component carriers is used to schedule the resources on each of the component carriers independently, m'=m, when R-PDCCH is used to schedule the resources on the one of the component carriers and the other ones of the component carriers in the cross-carrier way, m'=m+M (L)·$n_{CI}$, m is the number of blind decodings, and $n_{CI}$ is the identity information of the respective component carrier where the resources scheduled by R-PDCCH exist;
$Y_k = (A \cdot Y_{k-1}) \bmod D$, $Y_{-1} = n_{RNTI} \neq 0$, $n_{RNTI}$ is RNTI of relay node, A=39827, D=65537, k=$\lfloor n_s/2 \rfloor$, $n_s$ is the timeslot number in a current radio frame;
if the transmission mode of said R-PDCCH refers to a non-interleave mode, said base station determining the starting position of the search spaces in each timeslot included in each subframe on the component carriers according to the transmission mode and the aggregation level of R-PDCCH, by:
said base station determines the starting position of the search spaces via the formula below:

$$(L \cdot m' + i) \bmod N_{VRB}^{R\text{-}PDCCH}, i = 0,1,\ldots,L-1,$$

where, L is the aggregation level of R-PDCCH;
$N_{VRB}^{R\text{-}PDCCH}$ is the number of VRBs included in possible transmission resources set of R-PDCCH;
when the R-PDCCH carried by each of the component carriers is used to schedule the resources on each of the component carriers independently, m'=m, when R-PDCCH is used to schedule the resources on the one of the component carriers and on the other ones of the component carriers in the cross-carrier way, m'=m+M (L)·$n_{CI}$, m is the number of blind decodings, and $n_{CI}$ is the identity information of the respective component carrier where the resources scheduled by R-PDCCH exist.

11. The method according to claim 10, wherein, when said R-PDCCH schedules the resources on said one of the component carriers and on the other ones of the component carriers in the cross-carrier way, before said base station sends the multi-aggregated component carriers to said relay node, the method further comprises: said base station configuring, for the relay node, a corresponding relationship between the component carriers where the resources to be scheduled exist and the component carriers where the R-PDCCH carrying the resources to be scheduled exist.

12. The method according to claim 10, wherein
said base station sending multi-aggregated component carriers corresponding to R-PDCCH to said relay and the R-PDCCH carried by each of the component carriers independently being used to schedule the resources on each of the component carriers, comprises said base station carrying said R-PDCCH in the sent component carriers through search spaces, respectively;
when said R-PDCCH is used to schedule the resources on the one of the component carriers and the other ones of the component carriers in the cross-carrier way, the R-PDCCH carried in the component carriers sent by said base station to said relay node comprises multiple R-PDCCH information used to schedule the resources on said one of the component carriers and on the other ones of the component carriers respectively, said R-PDCCH information comprising the identity information of component carriers where the scheduled resource exists; and
for said one of the component carriers carrying the R-PDCCH corresponding to itself and the R-PDCCH corresponding to the other ones of the component carriers, and the R-PDCCH being used to schedule the resources on the one of the component carriers and on the other ones of the component carriers in the cross-carrier way, the method specifically comprises:
said base station carrying said R-PDCCH through multiple independent search spaces respectively in said sent component carriers, each of the search spaces carries R-PDCCH information and identity information of the component carriers where the scheduled resources exist; or
said base station carrying R-PDCCH through the shared search spaces in said sent component carriers, said search spaces carrying multiple R-PDCCH information and identity information of the component carriers where the scheduled resources exist.

13. The method according to claim 12, said search spaces of the component carriers are determined by at least one of the following ways:
said base station acquires the transmission mode and an aggregation level of R-PDCCH carried in the component carriers, wherein the transmission mode includes an interleave mode and a non-interleave mode; and
said base station determines a starting position of the search spaces in each timeslot included in each subframe on the component carriers according to the transmission mode and the aggregation level of said R-PDCCH.

* * * * *